United States Patent [19]
Matthews

[11] 3,870,822
[45] Mar. 11, 1975

[54] SUPPLYING A CHARGING CURRENT BY WAY OF TELEPHONE LINES OR THE LIKE

[75] Inventor: Oliver Charles Matthews, Edgware, England

[73] Assignee: The Post Office, London, England

[22] Filed: Feb. 14, 1972

[21] Appl. No.: 225,902

[52] U.S. Cl. .................... 179/4
[51] Int. Cl. .................... H04m 11/06
[58] Field of Search ........ 179/2.5 R, 4, 26; 340/310

[56] References Cited

UNITED STATES PATENTS

| | | | |
|---|---|---|---|
| 3,601,538 | 8/1971 | May | 179/2.5 R |

*Primary Examiner*—Ralph D. Blakeslee
*Attorney, Agent, or Firm*—Kemon, Palmer & Estabrook

[57] ABSTRACT

The invention provides a power supply at a point remote from a control power source by way of a telephone line. The remote power supply is generally derived from a rechargeable battery, although direct supply to the utilising device is possible. The battery charging current is only supplied to the line when it is in an "idle" state. This idle state is sensed at the power transmitter and receiver (central and remote points) and the charging source and chargeable source are then coupled to the line.

The invention does not cause degradation of the normal communication circuit as there is atmospheric disconnection of the charging circuit impedance when a "busy" condition is sensed for the line.

8 Claims, 6 Drawing Figures

SUPPLYING A CHARGING CURRENT BY WAY OF TELEPHONE LINES OR THE LIKE

The invention relates to a power supply system for supplying current from a central source to one or more remote locations by way of telephone lines or the like which are primarily intended to carry speech signals or other electrical signals conveying information. The system includes a power transmit unit, located at the central source, and a line power receive unit located at the remote location.

When used in conjunction with a telephone system, the invention enables electronic equipment, other than the telephones, situated at the suscribers premises to be powered from the exchange battery directly or by way of rechargeable batteries at the subscribers premises. The invention is particularly intended for use in a telephone system to charge Nickel-Cadmium cells for powering a subscribers carrier system at the subscribers terminal.

The invention enables the normal A and B wires of a telephone system to be utilised when they are carrying no communication traffic without causing any significant degradation of the telephone circuit when used for normal communications.

Present battery charging methods cause degradation of the telephone circuit performance, and can provide only very low charging current. The impedance of known charging circuits across the telephone line pair appear as a permanent low insulation between the A and B wires which can lead to dial pulse distortion, polarisation of the line relay through which the charging current flows, and combined with certain line conditions, premature ring trip.

To overcome, at least in part, the above disadvantages, the invention provides for automatic disconnection of the charging circuit impedance when the telephone line pair is in normal communication use. The apparatus used in the invention is arranged so that the charging current does not flow through the line relay. This permits the charging current to be higher, and mainly dependent upon the battery voltage and line resistance, Throughout this specification the terms busy and idle are used to indicate the two possible states of communication. The line is termed busy when a communication link is being set up, such as when dialling pulses are on the line, when communication is in progress, and when line testing is in progress. The line is termed idle when it is not required as a communication link, and when a communication link using the line has been terminated.

According to a first aspect of the present invention there is provided a power supply system for supplying current from an electrical direct current power source to an auxiliary load at a remote location by way of a telecommunication transmission line, said system including a power transmit unit and a line receiver unit situated at the location remote from the transmit unit: said transmit unit including first means to sense the state of communication and to connect, and to disconnect, the power source to, and from, the line, when the line is idle, and busy, respectively, said connection being made at the end of a first predetermined time interval from the line becoming idle, and said disconnection being made when the line is busied; and, said receiver unit including second means to sense the idle, and busy, state of communication, and arranged to connect the load to the line when the line is idle, and to cause the current from the power source to flow at the end of a second predetermined time interval from the line becoming idle, and said second means being arranged to disconnect the load from the line when the line is busied and required as a telecommunication link.

The first means may include a first sensing means, a first timing means, and a first switch means consisting of a solid state device, or a relay driven from a Schmitt trigger coupled by an emitter follower transistor circuit to a voltage level storage capacitor. The second means may include a second sensing means, a second timing means, and a second switch means consisting of a voltage controlled semi-conductor device such as an SCR.

Preferably the first predetermined time interval is not less than 40 seconds nor greater than 55 seconds and the second predetermined time interval is not less than 60 seconds nor greater than 80 seconds. The time interval may be determined by the time constant of a capacitor circuit charging or discharging and so arranged that the capacitor current retains the operative condition of a voltage sensitive switch, such as an SCR or a relay, or, other voltage controlled semiconductor switch means.

According to a second aspect of the present invention there is provided a method of charging, by way of a telecommunication transmission line, a re-chargable power source battery at a location in a communications system remote from an electrical direct current power source, so that, during normal communications using the line, the charging current is terminated and the impedance of the communication channel is made independent of any apparatus used in charging the battery, said method comprising: sensing whether the line is in busy or idle state; operating a first switch associated with the power source and arranged to connect the line either to calling equipment, or to the power source, dependent upon the sensed busy, or idle, state, respectively; and operating a second switch associated with the remote location and arranged to disconnect from, or to connect to, the line, the battery, dependent upon the sensed busy or idle state respectively.

The invention will now be described, by way of example, in a telephone system, in its application to charging NickelCadmium batteries located at a subscribers premises and used to form the power supply for a local line carrier system, and with reference to the accompanying diagrammatic drawings in which.

Figure 1:
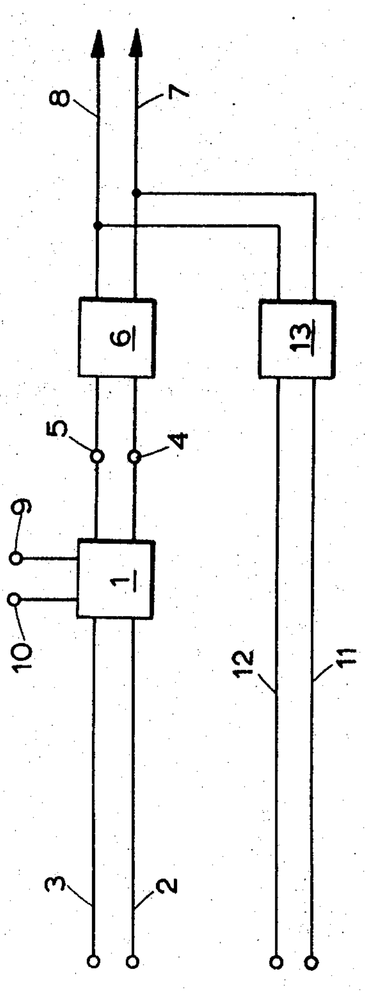
FIG. 1 shows in block schemmatic form equipment at the telephone exchange.

The invention will be described in its application to a communication system known as a local line carrier system. Referring now to the drawings, FIG. 1 shows a line power transmit unit 1 connected by way of the telephone pair lines 2 and 3 to a physical circuit and by way of terminals 4 and 5 and a filter 6 to lines 7 and 8 which form the cable pair to a subscriber. A suitable 50 volt power supply is connected across terminals 9 and 10 to the line power transmit unit 1. A derived circuit (not shown) is coupled by way of lines 11 and 12 to a WB (wire broadcast) carrier unit 13 which provides the carrier signal to the cable pair 7 and 8.

Figure 2:
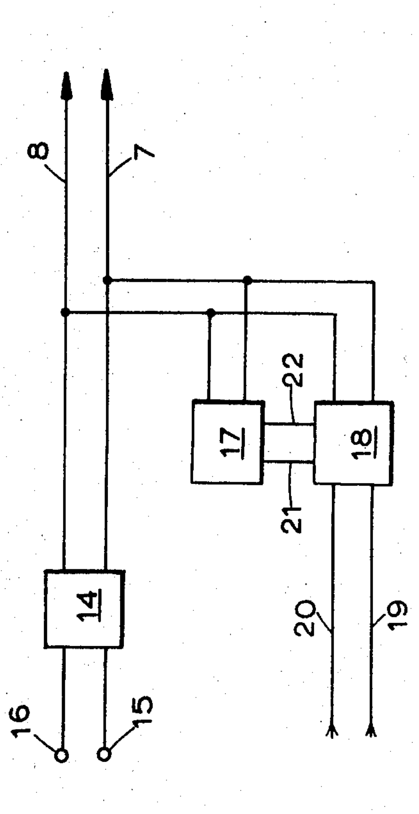
FIG. 2 shows in block schemmatic form equipment at the subscribers terminal.

Now, with reference to FIG. 2, at the subscribers terminal the cable pair 7 and 8 is connected by way of a filter 14 to a subscriber's physical circuit (not shown) connected to the terminals 15 and 16. The cable pair 7 and 8 is also connected to a line power receiver unit 17 and a WB carrier unit 18. The carrier unit 18 is connected by way of lines 19 and 20 to a subscriber's derived circuit (not shown). The line power receiver unit 17 supplies power to drive the WB carrier unit 18 by way of lines 21 and 22.

The circuit arrangements at the exchange and at the subscriber's terminal will now be described in more detail with reference to FIGS. 3 and 4 in which the reference numerals introduced in FIGS. 1 and 2 have been retained wherever possible, Firstly, considering the equipment at the exchange, the A and B telephone wires 2 and 3 respectively are connected to the contacts 23 and 24 of a relay which acts as a switch to connect the 50 volt supply across the terminals 9 and 10 to the cable pair to the subscriber by way of the terminals 4 and 5. The operating coil of the relay is shown schematically by the block 25. The coil 25 is connected in parallel with a diode to protect a transistor 26 against back e.m.f. The relay coil and diode is connected to the collector circuit of the transistor 26 the base of which is coupled by way of a resistor 27 to the collector of a transistor 28. The transistors 26 and 28 are coupled in a Schmitt trigger circuit including the resistors 29, 30 and 31. The transistor 28 is driven from an emitter-follower stage including a transistor 32 by way of a resistor 33. The base electrode of the transistor 32 is coupled to the junction between two diodes 34 and 35 by way of a resistor 36. The junction point between the diodes 34 and 35 is also coupled to the negative supply terminal 10 by way of a capacitor 37. The diode 34 is coupled to the negative supply terminal 10 by way of a resistor 39. The diode 35 is in parallel with a resistor 38 and is coupled to the positive supply terminal 9 by way of a resistor 40 and the emitter-collector path of a transistor 41. The emitter of the transistor 41 is also connected to the negative supply terminal 10 by way of a resistor 42 and the base of the transistor is connected to the junction between diodes 43 and 44 connected between the supply terminals 9 and 10. The drive signal for the transistor 41 is derived from the B wire 3 by way of a resistor 45 to the base of the transistor. The relay contacts 23 and 24 operate to connect the terminals 4 and 5 either directly to the wires 2 and 3 respectively or directly to earth and to the negative supply terminal 10 by way of the resistor 39 respectively.

The unit is installed in a telephone exchange and in operation is arranged to disconnect the line from the exchange calling equipment and to connect it to the 50 volt central battery (now shown) which is coupled across the terminals 9 and 10. The connection and disconnection is achieved by means of the relay 25 operating the contacts 23 and 24. Under normal conditions, that is to say, with no call or line testing in progress, the B wire 3 is at −50V as it is connected to the coil of the exchange calling relay through which no current is flowing as the contacts 23 and 24 are made. The relay is normally operated. Because the B wire 3 is at −50V thus stopping the transistor 41 from conducting and because the voltage developed across the resistor 39 due to the charging current through it is arranged to be insufficient to switch the Schmitt trigger via the diode 34 and the transistor 32, and because the voltage at the base of the transistor 28 is not sufficient to switch it on, then the transistor 26 will be conducting and the coil 25 energised to operate the relay.

When the exchange equipment applies a ringing current to the B wire 3, the line goes positive and a switching voltage signal is applied to the base of the transistor 41 by way of the resistor 45. This signal causes the transistor 41 to conduct and charge the capacitor 37 by way of the resistor 40 and the diode 35. The voltage across the capacitor 37 is applied by way of the emitter-follower 32 to the base of the transistor 28 so causing the Schmitt trigger to switch. As the transistor 26 ceases to conduct, the coils 25 will no longer be energised and the relay contacts 23 and 24 will change to connect the terminals 4 and 5 to the wires 2 and 3 respectively. The charging current is therefore disconnected from the line and the ringing voltage is extended to the physical telephone. Ringing will be inhibited by normal ring trip when the physical telephone is taken "off hook." The line power transmit unit will be held inoperative during the progress of the call by the current through the transmission bridge causing a positive voltage on the B wire 3. This voltage will be sufficient to hold the transistor 28 on, hence the transistor 26 will be held off and the relay will be released as the current through the coil 25 is insufficient to maintain the relay in the operated condition. The diodes 43 and 44 protect the base of the transistor 41 from extreme overvoltages and the resistor 45 presents and input resistance of greater than 2.5 MOhms under all conditions. The resistor 36 in the base circuit of the transistor 32 limits the current to the base of this transistor so as to protect the collector base junction if it is forward biased. The very high input impedance of transistor 32 is insignificant to the parallel resistor paths including elements 38, 40 and 42 which provide the capacitor 37 with a relatively high impedance through which it can discharge. On looping the physical line, i.e. the subscriber's phone off hook the current through the resistor 39 will increase causing the voltage across the capacitor 37 to rise, this will switch the Schmitt trigger and release the relay. The power unit is then held inoperative presenting a resistance of greater than 2.5 MOhms between the B wire 3 and earth.

The relay is prevented from following the ringing cadence and dial pulses by diodes 34 and 35 and the capacitor 37, which make it slow to operate and fast to release.

When the line is tested from the exchange the A and B wires 2 and 3 are looped by the testing arrangements causing the B wire 3 to go positive. This causes the capacitor 37 to charge and hence release the relay. After the positive voltage is removed from the wire 3 the diode 35 is reverse biased and the capacitor 37 discharges mainly through the resistors 38, 40 and 42 with a sufficient time constant (a delay period greater than 30 seconds each time the B wire 3 is earthed) to enable tests to be made before the relay operates. When the exchange equipment is disconnected and the wires 2 and 3 are looped by the tester, the relay operates due to the presence of a resistor 46 providing a resistive earth to the wire 2, when the contact 23 is made.

The operation of the line power receive unit will now be described with reference to FIG. 4. The unit is installed at a subscriber's premises and arranges for the automatic disconnection of the charging circuit impedance by switching SCR 47 to the non-conducting position. FIG. 4 also shows a secondary battery 48 formed by a number of nickel-cadmium cells connected to form a rechargeable voltage supply source of not greater than the exchange central battery voltage connected between lines 49 and 50 respectively. The line power receive unit of FIG. 4 consists of a bridge rectifier circuit 51 connected to the A and B wires 2 and 3 respectively by way of resistors 52 and 53. The output from the bridge rectifier circuit 51 is applied to lines 54 and 55. The line 54 is connected to line 49 by way of the SCR 47 and a resistor 56. The line 55 is connected to the line 50 by way of a diode 57. A capacitor 58 is connected between the line 50 and the junction between the resistor 56 and the anode of the SCR 47. This junction point is also connected to line 59 to provide a D.C. series regulator output. An SCR 60 is provided to guard against mis-operation of the SCR 47 during dialling by the subscriber and during tests made from the exchange. The anode from the SCR 60 is connected by way of a resistor 61 to the line 49. The cathode of the SCR 60 is connected by way of a resistor 62 to the line 54. The gate electrode of the SCR 60 is connected to the junction point between resistors 63 and 64 which bridge the SCR 47 and resistor 56 between the lines 49 and 54. A capacitor 65 is connected between the cathode of the SCR 60 and the line 49. The switching of the SCR 47 is achieved by means of a further SCR 66 connected in series with a resistor 67 and the resistor 62 across the anode - cathode path of the SCR 47. The gate electrode of the SCR 47 is connected to the junction between the resistor 67 and the anode of the SCR 66. The gate electrode of the SCR 66 is connected to the junction between resistors 68 and 69 which are connected in parallel with the resistors 63 and 64. A capacitor 70 coupled to the gate electrode of the SCR 66 is connected in parallel with the resistor 69.

In operation, under normal working conditions i.e. no call or line testing in progress, the SCR 47 and the diode 57 are conducting so supplying current to the rechargeable battery 48, and if necessary to a D.C. series regulator (not shown) connected to the line 59. The current drawn from the exchange battery by way of the bridge network 51 is dependent on the value of resistors 52, 53, 56, and the difference between the rechargeable battery voltage and exchange control battery voltage.

The resistors 52 and 53 are provided when carrier channel is superimposed on the line so as to reduce the shunting effect on the carrier channel of the subscriber's charging unit. If a larger current is required these resistors can be replaced by small inductors with a impedance greater than 1.4 Kohms at the carrier frequency. The bridge rectifier circuit 51 makes the unit insensitive to changes in line polarity.

A reduction in line voltage causes the SCR 47 to switch off and the diode 57 to provide a high impedance leaving a resistance across the line greater than 2.5 MOhms. The diode 57 is preferably a Zener diode providing a high impedance in the negative leg of the circuit when no current flows. This ensures that the charging circuit presents a balanced load to the line, in the high impedance condition. This condition applies when any of the following situations occur:- a. A loop on the line.
b. The presence of ringing current.
c. Line open circuit

When the voltage across the wires 2 and 3 falls, the SCR 47 will switch off rapidly due to the current flowing through it falling below the holding current, and also due to it becoming reversed biased, when the anode voltage falls below that of the cathode which is maintained instantaneously at a higher level by the capacitor 58.

Without the SCR 60 it is possible for the gate voltage of the SCR 66 to fall below that of the anode, which will be rising steadily as the capacitor 65 charges. The SCR 66 will then conduct instantaneously causing the SCR 47 also to conduct instantaneously. This could give rise to dial pulse distortion or false indications during tests made from the exchange. The SCR 60 is switched on by the gate voltage going negative with respect to the anode which is maintained by the voltage across the capacitor 65. The voltage across the capacitor 65 is discharged by way of the resistor 61. The gate voltage set by the impedance of the resistors 63 and 64 must fall when there is a reduction in the voltage across the wires 2 and 3.

The capacitor 70 is provided to delay the fall of the gate voltage at the SCR 66 so that the SCR 60 switches on before the SCR 66 when the input voltage from the line 54 falls. The ratio of the impedance of the resistors 63 and 64 is arranged so that when the capacitor 65 is charging with the subscriber's unit in the high impedance condition the SCR 66 will switch on before the SCR 60.

In a particular embodiment of the invention the line power receive unit was arranged to switch on approximately 45 seconds after the return of normal line voltage to the wires 2 and 3. This occurs when:- a. A looped on the line is removed.
b. Ringing current ceases.
c. When any open circuit line condition is removed.

The line voltage across the wires 2 and 3 charges the capacitor 65 through the resistor 62. As the capacitor 65 charges the voltage at the anode of the SCR 66 rises until it is positive with respect to the gate, at which voltage the SCR 66 switches on and the capacitor 65 is discharged through the resistor 67 and the gate of the SCR 47 which is switched to the on condition. The diode 57 will now conduct due to the current being drawn through it and the unit is then in the normal condition. It will be appreciated that although the method of charging a secondary battery from a remote power supply has been described with reference to a telephone system the invention is equally applicable to other communication systems. It will also be appreciated that the line power receive unit located at the subscriber's equipment and the line power transmit unit located at the exchange each include novel circuit arrangements which may in themselves by adapted for operation other than as described in the specific embodiment above.

Figure 3:
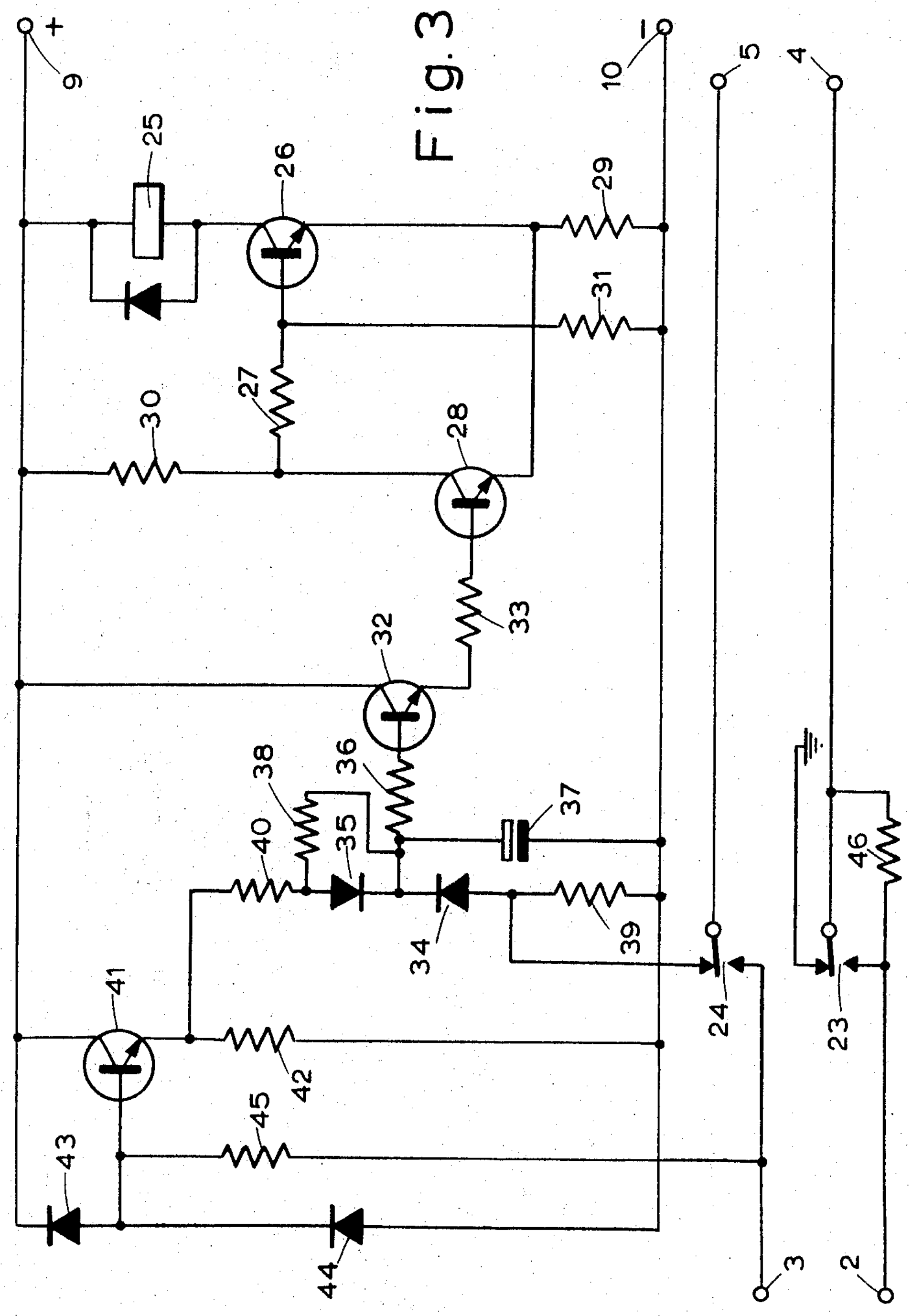
FIG. 3 is a diagrammatic circuit of the line power transmit unit at the exchange.
Figure 4:
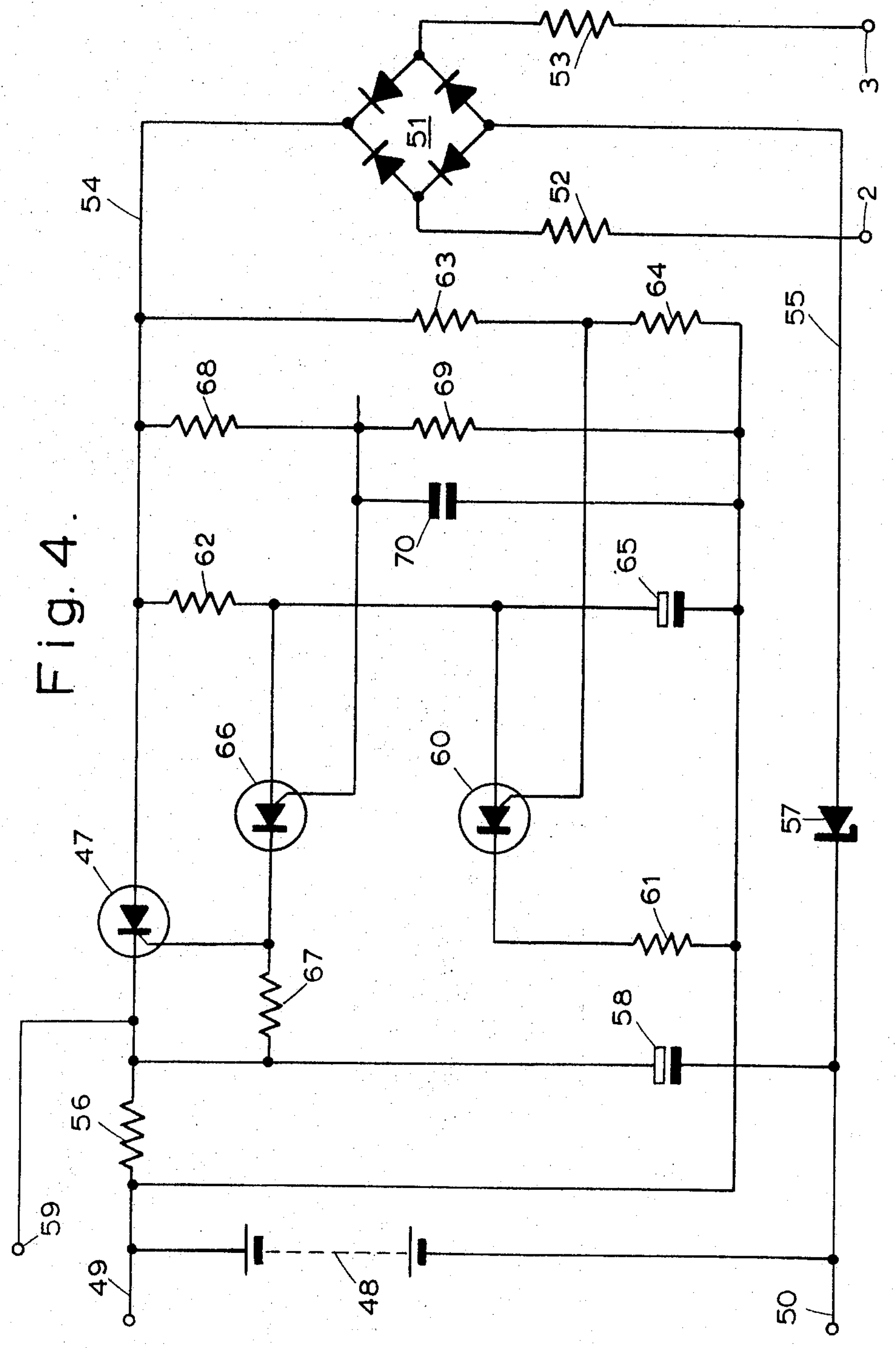
FIG. 4 is a diagramatic circuit of the line power receive unit at the subscribers terminal.

The invention may be used with a shared service if the circuit of FIG. 3 is modieief to provide for sensing the voltages on both the A and B wires and to operate if either of the sensed voltages indicates a busy state on the line.

One suitable modification for shared service is shown in 5 and consists of a resistor 71 connected in series with a capacitor so as to provide an a.c. path between the A line and the base of a transistor which is used to monitor the busy and idle state of the line.

Figure 5:
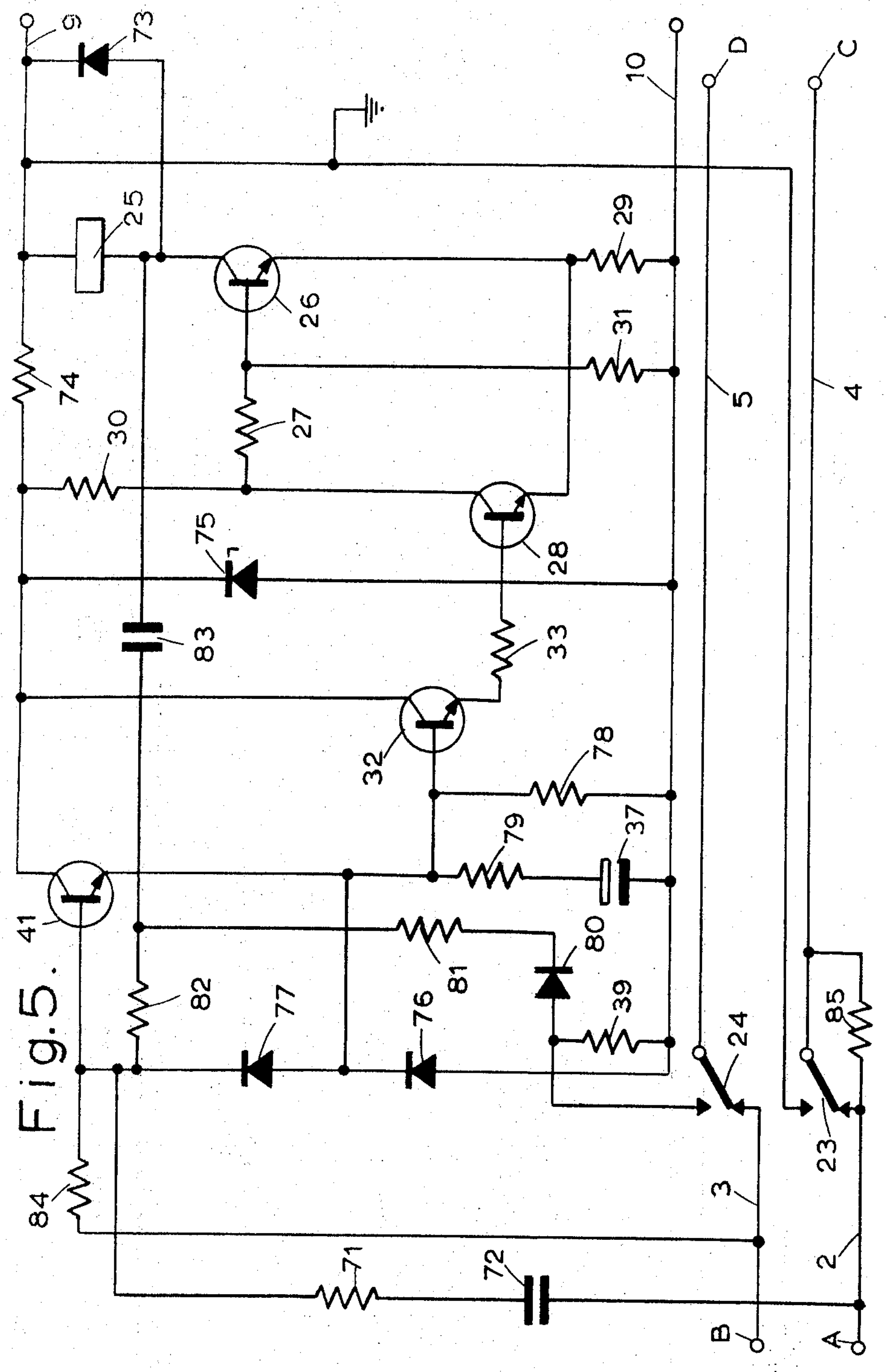
FIG. 5 is a modified form of the circuit as shown in FIG. 3.
Figure 6:
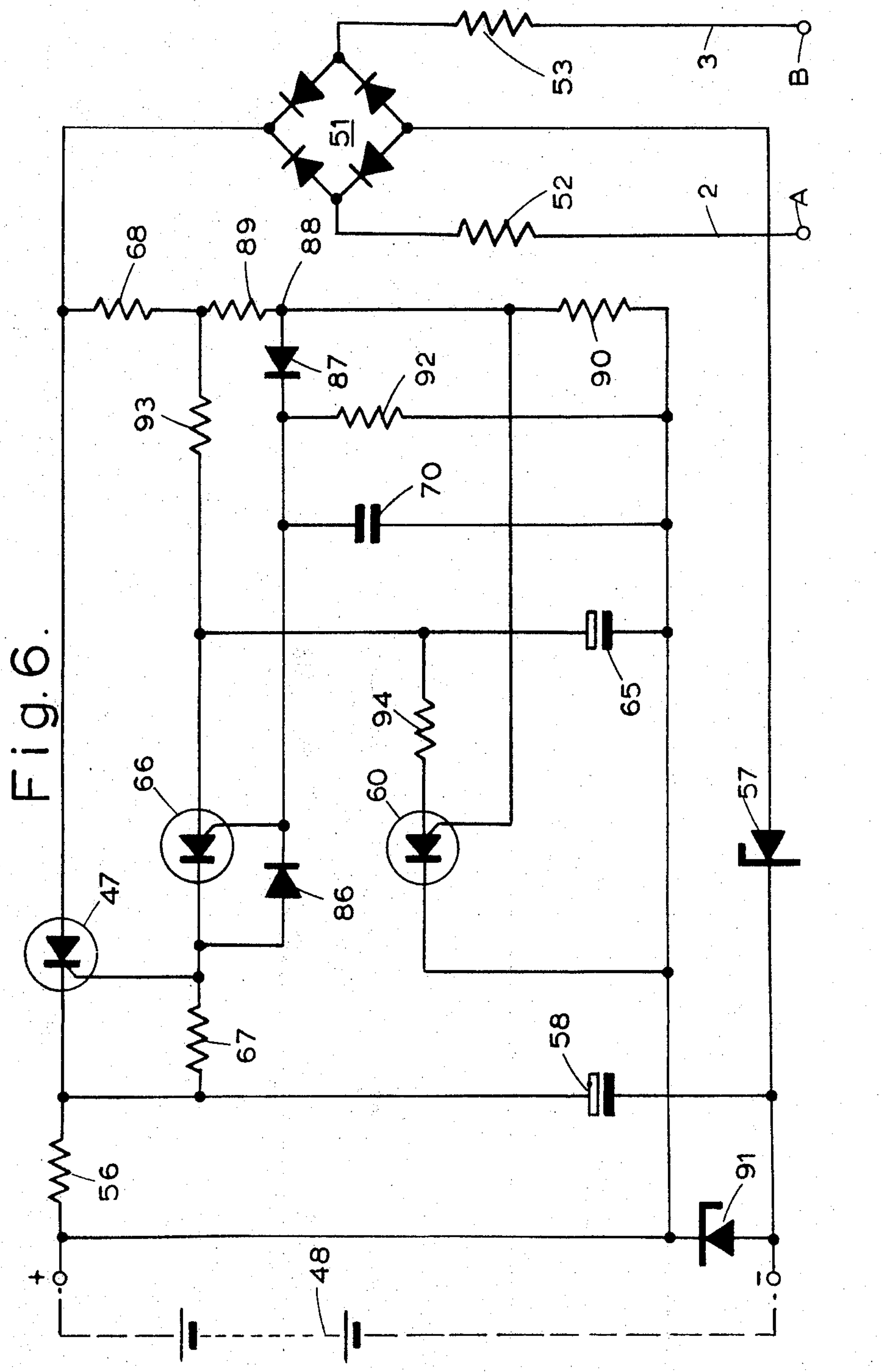
FIG. 6 is a modified form of the circuit as shown in FIG. 4.

With reference now to FIGS. 5 and 6, the system basically comprises a transmit unit as shown in FIG. 5 which is installed at a telephone exchange location and a receive unit as shown in FIG. 6 which is installed at a subscribers premises. The system enables electronic equipment, other than the telephone located at a subscribers premises to be powered from the exchange battery either directly ot from a secondary power source such as a rechargeable nickel-cadmium cell. The addition equipment located at a subscribers premises is considered to be a subscribers carrier system powered from the local rechareable batteries. The power is derived from a trickle-charged Ni-Cd secondary battery which obtains its power by way of the telephone lines from the central exchange battery during idle line conditions. The charging circuit for the battery automatically disconnects when the telephone circuit is in normal use, or when tests are being carried out on the telephone line as previously described with reference to FIGS. 3 and 4.

Referring now to FIG. 5 the Line Power Transmit Unit is connected by the P relay to the A wire 2 and the B wire 3 to the Exchange equipment. The transmit unit connects the central exchange battery (not shown), which is connected between the lines 9 and 10, to the subscriber's cable pair 4 and 5. The coil 25 of the P relay is in the collector circuit of a transistor 26 driven from the emitter follower arrangement including transistors 28 and 32. The P relay operates a pair of contacts 23 and 24 which in FIG. 5 are shown connecting the A and C wires and B and D wires respectively. The coil 25 is bridged by a diode 73 between the collector electrode of the transistor 26 and earth line 9.

In the quiescent condition A and B wires 2 and 3 give earth and battery conditions from the Exchange calling equipment. The −50 volt battery at the wire 3 causes the P relay to operate. The contacts 11 and 24 are therefore changed over from their position as shown in FIG. 5 and and now supply the battery and earth conditions to the cable pair 4 and 5 by way of a resistor 39 and an earthline which is directly connected to the line 9.

The transistors 26 and 28 form a Schmitt trigger circuit with their emitters commoned and connected by way of a resistor 29 to the −50 volt battery line 10. The collector of the transistor 28 is connected by way of a resistor 30 and resistor 74 to the earthed line 9, and by way of a potential divider network, a junction of which is connected to the base of the transistor 26, which is formed by resistors 27 and 31, to the line 10. The potential at the junction between the resistors 30 and 74 is maintained by a zener diode 75 which is connected between this junction to the line 10. The transistor 28 is driven from an emitter follower stage including transistor 32 by way of a resistor 33. The base electrode of the transistor 32 is coupled to the junction between two diodes 76 and 77 which are connected between the line 10 and the base electrode of a transistor 41. The base electrode of the transistor 32 is also directly connected to the emitter of the transistor 41, and also by way of a resistor 78 to the line 10. An RC time constant is built within the circuit by means of a resistor 79 and a capacitor 37 in series between the −50v. battery line and the base electrode of the transistor 32. A diode 80 is connected between the junction of a resistor 82 and capacitor 83 and one of the contacts of the P relay. The potential on the B wire 3 is sensed by the transistor 41 as the base electrode is connected to the wire 3 by way of a resistor 84. A resistor 85 is coupled between the A and C wires.

The P relay is normally operated as the −50v on the B wire 3 prevents the transistor 41 from conducting so the Schmitt trigger does not operate and the voltage on the base of the transistor 26 is sufficient to keep it switched on. When the Exchange equipment applies a ringing current to the B wire 3 the line goes positive and the transistor 41 conducts, charging the capacitor 37 by way of the resistor 79. The Schmitt trigger is therefore switched on and consequently the transistor 26 is turned off so de-energising the coil 25. The charging current is therefore disconnected from the subscribers pair 4 and 5 automatically when a ringing voltage is applied to the line.

Ringing will be inhibited by the normal ring trip when the physical telephone is taken off hook. The current through the transmission bridge will retain a positive voltage with respect to supply line 10 on the B wire 3 whilst the call is in progress and this positive signal will retain the transistor 41 in a conductive condition. The diodes 76 and 77 protect the transistor 41 from extreme overvoltage and the resistor 84 has a high impedance (in a specific embodiment 2.7 MOhms.). The P relay is made slow to operate and fast to release by the diode 80 and capacitors 37 and 83 to prevent the relay from following the ringing cadence and dialling pulses. The P relay is arranged to operate and connect the supply voltage to the subscribers pair 4 and 5 when the following conditions are satisfied;

a. The exchange 50v DC supply is connected
b. Terminals C and D open circuit
c. Terminal B is connected by way of the line relay of the exchange equipment to the negative supply line 10.

The P relay is arranged to release when any of the following conditions are applied for a period greater than a predetermined minimum (in a specific embodiment) greater than 50ms:

a. The B wire is made sufficiently positive with respect to supply line 10 to operate the transistor 41 or
b. The B wire is earthed or
c. The A and B wires are looped or
d. A subscriber or test load is connected across terminals C and D.

In a specific embodiment of the transmit unit the components have the following values:

| | | | |
|---|---|---|---|
| Resistor | 39 | 220 | Ω |
| Resistor | 29 | 100 | Ω |
| Resistor | 30 | 10 | K Ω |
| Resistor | 74 | 3 | K Ω |
| Resistor | 27 | 27 | K Ω |
| Resistor | 31 | 27 | K Ω |
| Resistor | 33 | 39 | K Ω |
| Resistor | 78 | 390 | K Ω |
| Resistor | 79 | 4.7 | K Ω |
| Resistor | 82 | 1 | M Ω |
| Resistor | 84 | 2.7 | M Ω |
| Resistor | 85 | 27 | K Ω |
| Resistor | 71 | 2.7 | M Ω |
| Capacitor | 37 | 50 | μ. F. Electrolytic |
| Capacitor | 75 | 0.22 | μ. F. Polyester |
| Capacitor | 72 | 10 | pF |

-Continued

| | | |
|---|---|---|
| Diode | 73 CV | 8790 |
| Diode | 75 CV | 7106 |
| Diode | 76 CV | 8790 |
| Diode | 77 CV | 8790 |
| Diode | 80 CV | 8790 |
| Transistor | 26 CV | 7644 |
| Transistor | 28 CV | 10806 |
| Transistor | 32 CV | 10806 |
| Transistor | 41 CV | 10806 |

The relay P is a low profile type 225/TS/22333/3 manufactured by:-
Magnetic Devices Ltd
Newmarket
Suffolk.
Referring now to FIG. 2 the Receive Unit operates to connect and disconnect the A and B wires 2 and 3 from a rechargeable Ni-Cd battery 48 which is arranged to power a subscribers carrier system. The A and B wires supply power by way of resistors 52 and 53 respectively across a bridge rectifier 51. One side of the output of the bridge 51 is connected by way of a zener diode 57 to the battery 48 and the other output is connected by way of a thyristor 47 and resistor 56 to the other battery terminal. thyristor 42 and resistor 56 to the other battery terminal. The thyristor 47 is controlled by way of a trigger circuit arrangement including two programmable uni-junction transistors 60 and 66.

Thyristor 47 is switched to the conductive condition by a signal applied to its trigger electrode and derived from the anode electrode of the transistor 66.

The anode of the transistor 66 is connected by way of a resistor 67 and the thyristor 47 and by way of a capacitor 58 to the negative terminal of the battery 48. The diode 86 is connected between the anode and trigger electrode of the transistor 66. The transistor 66 is switched by means of a signal via diode 87 connected between the trigger electrode of the transistor 66 and the junction 88 in a potential divider network formed by resistors 68, 89, 90 and a zener diode 91. A capacitor 70 and a resistor 92 are connected in parallel between the trigger electrode of the transistor 66 and the junction between the resistor 90 and diode 91. The holding current for the transistor 66 is derived from the junction between resistors 68 and 89 by way of a resistor 93. The holding current for the transistor 60 is also derived from the junction between the resistor 93 and the resistor 94. A capacitor 65 is connected between the junction between resistors 93 and 94 and the junction between resistor 90 and diode 91. The transistor 60 is provided to guard against false operation of the thyristor 66 during dialling by the subcriber and during tests made from the exchange.

In operation under normal working conditions i.e. no call or line testing in progress the thyristor 47 and the diode 57 supply charging current to the battery 48. The resistors 53 and 53 are in the supply lines to the bridge 51 so as to reduce the shunting effect on the carrier channel superimposed on the line. If there is a reduction in line voltage the thyristor 47 is arranged to switch off and the diode 57 provides a high impedance leaving the resistance across the line relatively high (in a particular embodiment greater than 2.5 M OHms). The thyristor 47 switches off rapidly as the current flowing through it falls below the holding current and also as it becomes reversed biased from the battery 48 and the charged capacitor 58. The capacitor 70 is provided to delay the fall of the gate voltage on the transistor 66 so that transistor 60 is switched on before transistor 66 when the line voltage falls. The ratio of the impedance of the resistors 68, 89 and 90 is arranged so that when the capacitor 70 is charging the transistor 66 will switch on before the transistor 60. Because of the time constant introduced into the the receive unit the line power will only be supplied to the battery 48 after a predetermined time interval after the line voltage on the A and B wires have returned to normal.

In a particular embodiment of the invention the components of FIG. 6 have the following values:-

| | | | |
|---|---|---|---|
| Resistor | 52 | 680 | Ω |
| Resistor | 53 | 680 | Ω |
| Resistor | 56 | 1.2 | K Ω |
| Resistor | 67 | 1 | K Ω |
| Resistor | 68 | 2.7 | M Ω |
| Resistor | 39 | 560 | K Ω |
| Resistor | 90 | 1 | M Ω |
| Resistor | 92 | 10 | M Ω |
| Resistor | 93 | 4.3 | M Ω |
| Resistor | 94 | 1 | K Ω |
| Capacitor | 58 | 10 | μ F Electrolytic |
| Capacitor | 70 | 0.1 | μ F Polyester |
| Capacitor | 65 | 15 | μ F Solid Tantalum |
| Diodes | | | |
| Bridge Rectifier | 51 | | CV 8805 |
| Diode | 57 | | CV 7138 |
| Diode | 86 | | CV 8790 |
| Diode | 87 | | CV 8790 |
| Diode | 91 | | Zener 11 - 11.5v 400mw. |

Thyristor 47 Post Office type 11
Programmable Uni-junction Transistors 66 and 60 - Post Office type 12

The line power receive unit is installed in a subscribers premises (for example carrier circuit subscriber of a 1+1 subscriber carrier system) and is connected by way of the A and B Terminal to the telephone pair. In the idle or quiescent condition i.e. telephone on hook the charging current is applied to the rechargeable battery from the Exchange battery normally connected to the telephone pair. The P relay should connect the charging current to the line and is arranged to operate in the particular embodiment not later than 55 seconds and not before 40 seconds after the occurance of any of the conditions previously stated which are necessary for the P relay to operate. The delay introduced in the receive unit in the particular embodiment, is arranged so that current would not commence flowing less than 60 seconds and not more than 80 seconds after the application of the dc voltage.

It will be appreciated that the invention is not limited to the specific embodiment described above, neither is it limited in application as will be apparent to one skilled in the art.

I claim:

1. A power supply system for supplying current from an electrical direct current power source to an auxiliary load at a remote location by way of a telecommunication transmission line, said system including a power transmit unit and a line power receiver unit situated at the location remote from the transmit unit; said transmit unit including first means to sense the state of communication and to connect, and to disconnect, the power source to, and from, the line, when the line is idle, and busy, respectively, said connection being made at the end of a first predetermined time interval from the line becoming idle, and said disconnection being made when the line is busied; and, said receiver unit including second means to sense the idle, and busy state of communication, and arranged to connect the load to the line when the line is idle and to cause the current from the power source to flow at the end of a second predetermined time interval from the line becoming idle, and said second means being arranged to disconnect the load from the line when the line is busied and required as a telecommunication link.

2. A receiver unit for a power supply system arranged to receive current supplied by way of a telecommunication transmission line, from an electrical direct current power source to an auxiliary load, said receiver unit comprising a second sensing means to sense the idle, and busy state of communication, and a second switch means arranged to connect the load to the line when the line is idle and to cause the current from the power source to flow at the end of a second predetermined time interval, set by a second timing means from the line becoming idle, and said second switch means being arranged to disconnect the load from the line when the line is busied and required as a telecommunication link.

3. A receiver unit as claimed in claim 2 in which the second timing means consists of a second circuit arrangement including a capacitor coupled to a voltage controlled semi-conductor switch and arranged to provide the said second predetermined time interval between 60 and 80 seconds.

4. A receiver unit as claimed in claim 3 in which the receiver unit is connected to the line by way of a bridge rectifier circuit.

5. A method of charging, by way of a telecommunication transmission line, a rechargeable battery at a location in a communication system remote from an electrical direct current power source, so that, during normal communications using the line, the charging current is terminated and the impedance of the communication channel is made independent of any apparatus used in charging the battery, said method comprising: sensing whether the line is in a busy or idle state; operating a first switch associated with the power source and arranged to connect the line either to calling equipment, or to the power source, dependent upon the sensed busy, or idle, state, respectively; and operating a second switch associated with the remote location and arranged to disconnect from, or to connect to, the line, the battery, dependent upon the sensed busy or idle state respectively.

6. A power supply system as claimed in claim 1 in which the power transmit unit comprises a first sensing means to sense the state of communication of the line, and first switch means to connect, and to disconnect, the power source, to and from, the line, when the line is idle, and busy, respectively, said connection being made at the end of a first predetermined time interval, set by a first timing means, from a line becoming idle, and said disconnection being made when the line is busied.

7. A transmit unit for supplying current, by way of a telecommunication transmission line, from an electrical direct current power source to an auxiliary load, remote from the direct current power source and to which current is arranged to flow at the end of a second predetermined time interval from the line becoming idle, said transmit unit comprising a first sensing means to sense the state of communication of the line, first switch means to connect, and to disconnect the power source to and from, the line, when the line is idle, and busy, respectively, said connection being made at the end of first predetermined time interval set by a timing means consisting of a first circuit arrangement including a first capacitor, the voltage across which is monitored by a voltage sensitive switch device incorporating a relay which is driven by an emitter follower transistor circuit from a Schmitt trigger arranged to provide a time interval between 40 and 55 seconds, and said disconnection being made when the line is busied.

8. A transmit unit as claimed in claim 4 in which a capacitor and a resistor are connected in series between one conductor of the line and the first sensing means to permit shared subscriber operation.

* * * * *

UNITED STATES PATENT OFFICE
CERTIFICATE OF CORRECTION

PATENT NO. : 3,870,822
DATED : March 11, 1975
INVENTOR(S) : OLIVER CHARLES MATTHEWS It is certified that error appears in the above-identified patent and that said Letters Patent are hereby corrected as shown below:

[30] Foreign Application Priority Data

February 16, 1971 Great Britain...........4699/71

August 20, 1971 Great Britain...........39135/71

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*